(12) United States Patent
Ekern

(10) Patent No.: US 8,643,206 B2
(45) Date of Patent: Feb. 4, 2014

(54) RENEWABLE ENERGY SYSTEM

(76) Inventor: Rod Ekern, Arlington, TX (US)

( * ) Notice: Subject to any disclaimer, the term of this patent is extended or adjusted under 35 U.S.C. 154(b) by 388 days.

(21) Appl. No.: 13/069,633

(22) Filed: Mar. 23, 2011

(65) Prior Publication Data

US 2012/0019004 A1   Jan. 26, 2012

Related U.S. Application Data

(60) Provisional application No. 61/365,938, filed on Jul. 20, 2010.

(51) Int. Cl.
| *F03B 13/10* | (2006.01) |
| *F03B 13/12* | (2006.01) |
| *H02P 9/04* | (2006.01) |
| *F01D 15/10* | (2006.01) |
| *F02C 6/00* | (2006.01) |
| *H02K 7/18* | (2006.01) |
| *E02B 9/08* | (2006.01) |

(52) U.S. Cl.
USPC .................................. 290/53; 290/52; 405/76

(58) Field of Classification Search
USPC .......................................... 290/52, 53; 405/76
See application file for complete search history.

(56) References Cited

U.S. PATENT DOCUMENTS

| 1,796,618 | A | * | 3/1931 | Petersen | 417/330 |
| 2,278,818 | A | * | 4/1942 | Zoppa | 417/330 |
| 2,724,082 | A | * | 11/1955 | Hornfeck | 318/482 |
| 3,993,913 | A | * | 11/1976 | Dickman | 290/53 |
| 4,076,447 | A | * | 2/1978 | Granath et al. | 415/3.1 |
| 4,104,536 | A | * | 8/1978 | Gutsfeld | 290/54 |
| 4,109,160 | A | * | 8/1978 | Goto et al. | 290/52 |
| 4,110,980 | A | * | 9/1978 | Foulke | 60/325 |
| 4,132,901 | A | * | 1/1979 | Crausbay | 290/53 |
| 4,172,689 | A | * | 10/1979 | Thorsheim | 415/7 |
| 4,272,685 | A | * | 6/1981 | Toyama | 290/52 |
| 4,332,506 | A | * | 6/1982 | Andrews | 405/77 |
| 4,622,471 | A | * | 11/1986 | Schroeder | 290/42 |
| 4,717,831 | A | * | 1/1988 | Kikuchi | 290/53 |
| 5,217,324 | A | * | 6/1993 | Freelain | 405/76 |
| 5,279,512 | A | * | 1/1994 | Manale | 446/217 |
| 5,420,463 | A | * | 5/1995 | Agostino | 290/54 |
| 6,355,988 | B1 | * | 3/2002 | Maple | 290/54 |
| 6,359,347 | B1 | * | 3/2002 | Wolf | 290/54 |
| 6,445,078 | B1 | | 9/2002 | Cieslak, Jr. | 290/1 R |
| 6,792,753 | B2 | | 9/2004 | Hastings | 60/398 |
| 6,968,683 | B2 | * | 11/2005 | Shields | 60/398 |
| 7,003,955 | B2 | * | 2/2006 | Davis | 60/641.11 |
| 7,084,521 | B1 | * | 8/2006 | Martin | 290/54 |

(Continued)

FOREIGN PATENT DOCUMENTS

JP        04277215 A   * 10/1992 ............... E02B 9/00
WO      WO 97/21922 A1    6/1997

*Primary Examiner* — Pedro J Cuevas
(74) *Attorney, Agent, or Firm* — Charles D. Gunter, Jr.

(57) ABSTRACT

A water based renewable energy system is shown which uses tidal flow and an associated water wheel/weir assembly to provide pumping power for the system. A water wheel powered pump and associated piping are used to raise water from a lower lake reservoir to a higher storage lake reservoir. The water which is pumped to the higher storage lake can be released to a generator located at a lower elevation and then returned to the lower storage lake. The cycle can then be repeated by again pumping water from the lower lake to the upper lake. The pumped storage provides flow and head to generate electric power through the turbine generator.

10 Claims, 6 Drawing Sheets

(56) References Cited

U.S. PATENT DOCUMENTS

| | | | |
|---|---|---|---|
| 7,478,974 B1 * | 1/2009 | Kelly | 405/78 |
| 7,656,050 B2 * | 2/2010 | Riley | 290/43 |
| 7,795,749 B1 | 9/2010 | Weber | 290/53 |
| 7,866,919 B2 * | 1/2011 | Miller | 405/80 |
| 7,902,687 B2 | 3/2011 | Sauer et al. | 290/54 |
| 7,952,219 B2 * | 5/2011 | Riley | 290/54 |
| 8,008,796 B2 * | 8/2011 | Muchow | 290/54 |
| 8,461,702 B2 * | 6/2013 | Cortes et al. | 290/1 R |
| 2004/0084178 A1 * | 5/2004 | Reid | 166/250.15 |
| 2005/0034452 A1 * | 2/2005 | Davis | 60/398 |
| 2009/0322091 A1 | 12/2009 | Jack | 290/53 |
| 2012/0299304 A1 * | 11/2012 | Al-Saffar | 290/54 |

* cited by examiner

RENEWABLE ENERGY SYSTEM

CROSS REFERENCE TO RELATED APPLICATIONS

The present application claims priority from a previously filed provisional application, Ser. No. 61/365,938, filed Jul. 20, 2010, entitled "Renewable Energy Project", by the same inventor.

BACKGROUND OF THE INVENTION

1. Field of the Invention

The present invention relates generally to sources of renewable energy, and more particularly to a system for harnessing tidal energy, for example to generate electricity or other forms of energy, whether directly or indirectly.

2. Description of the Prior Art

Due to the limitations of non-renewable energy sources, such as oil and coal, as well as the negative environmental effects of such energy sources, a need exists for the provision of alternative energy conversion and transfer systems that are based on renewable sources of power. At the present time, there is increasing interest in renewable energy sources such as solar, wind, wave and tidal power.

The tremendous growth in renewable energy over the past several years is well documented and the rate of growth continues to increase each year. With worldwide awareness of the negative environmental impacts of fossil fuels on our global environment, growth in the use of renewable energy appears to be constrained only by the ability to produce and deliver it at an economic price. Wind power, for example, has now entered the mainstream and has been the fastest growing segment of the energy industry over the last several years. Despite the current movement supporting renewable energy sources, many legislators and policy-makers are attempting to meet these demands through projects which relate solely to wind and solar power generation, and do not address renewable energy produced from water.

This lack of attention to water as a source of renewable energy is short-sighted. Ocean and tidal currents are capable of providing a virtually inexhaustible supply of emission-free renewable energy. Since ocean and tidal currents exist everywhere in the world, converting the energy in these currents to electricity could provide a predictable and reliable supply of electricity to the electric power systems of remote sites in many parts of the world. Since some seventy percent of the world's population lives within about 200 miles of an ocean, ocean current energy and ocean tidal energy could become a vital part of the world's energy future. There are countless numbers of island communities where ocean currents accelerate around and between land masses. These coastal communities could easily benefit from the use of ocean power. With its vast and geographically dispersed resources, ocean current energy and its associated tidal energy have the potential of becoming the next "wind" of renewable energy.

Numerous schemes for harnessing tidal power have also been developed over the years. Tidal power devices offer advantages over wave power devices. Tides are regular and predictable, whereas wave power depends essentially upon weather conditions. Another advantage of tidal power devices is the fact that less complex structures can be employed at coastal sites, because locations for tidal devices are generally exposed to less extreme weather so that the devices do not have to be constructed to the same level of survivability as ocean wave power devices.

In the past schemes, for harnessing "water power" as energy sources have typically involved water storage systems. Current methods for accumulating and preserving water supplies include storage systems, such as dams, levies, basins, wells and reservoirs. However, these storage systems are not sufficient to meet the ever increasing needs of the world's population. As a result, renewable water and energy shortages are now commonplace, and plans for future needs are problematic. Other of the previous attempted solutions for water based renewable energy systems have included systems for distributing water between reservoirs. One example is the Blenheim-Gilboa pumped storage power project located in the Catskill Mountain region of the United States. This system uses a reservoir system capable of generating electricity in peak demand periods by drawing water from Schoharie Creek and recycling it between two huge reservoirs. However, this project involves the use of a traditional hydroelectric facility which would not be economically feasible for many underdeveloped parts of the world.

WIPO Publication No. WO9721922 to Curtui, entitled "Total Electric Water System," published Jun. 19, 1997, discloses a reservoir system with multiple segments of piping placed in series, wherein a lower elevation is reached by distributing water from a higher elevation. The water is directed out of the pipeline system and becomes a source of water at a lower elevation or is directed to areas with a water deficit. The pipeline system is made up from one or more units set downwardly each unit in connection with the other.

U.S. Pat. No. 4,192,627 to Casebow entitled "Apparatus for Generating Electrical Power" issued Mar. 11, 1980, discloses a system designed to maintain constant head pressure to achieve continuous electrical power generation. The system employed uses interconnected reservoirs for the purpose of generating electrical power.

U.S. Pat. No. 6,792,753, to Hastings, issued Sep. 21, 2004, shows a system for generating power, including a barrier partially dividing a body of water subject to tidal effects into two regions of water such that said regions of water have differing water levels over a tidal cycle. A passage is provided in the barrier for placing the regions of water in fluid communication with each other; and means are also provided within said passage responsive to flow of water for driving a power generator. Water flows from one of the regions of water to the other of the regions of water via said passage when the regions have differing water levels during a tidal cycle.

U.S. Pat. No. 7,795,749, to Weber, issued Sep. 14, 2010, shows a hydroelectric generating system coupled to a primary tidal reservoir through a bi-directional tideway to power a primary turbine as a diurnal cycle tide waxes and wanes. A secondary tidal reservoir includes a tideway and secondary turbine with flow modulated by a graduated control of a sluice gate to proportionately blend reserve tidewater capacity of the secondary tidal reservoir as a delayed resource of virtual tidal influx and reflux. An aggregate summation of tidal energy acting upon the turbine driven generators delivers a constant flow of electric power throughout the diurnal tidal cycle. Shunting excess tidal energy around the turbines during periods of reduced power-demand supplements tidal resources in subsequent phases of the diurnal tidal day when solar-day related power-demand may increase.

U.S. Patent Publication No. 2009/0322091, to Jack, published Dec. 31, 2009, describes a tidal power apparatus which includes a moored pontoon (1) having a duct (2) therethrough opening at opposed ends of the pontoon. The duct has a vertical axis rotor (3) therein driving an electrical generator (6). A deflector vane (8) is located in the duct at each end thereof, each deflector vane being mounted to pivot about a vertical axis between an active position, in which the deflector vane deflects water flow to one side of the rotor axis to cause rotation of the rotor, and an inactive position substantially aligned with the water flow from the turbine.

The above references are merely intended to be representative of the current state of the art in water storage and tidal energy devices and methods, which, despite various advances, continue to present the need for a system and method for efficiently producing a renewable water based energy supply, which supply may be distributed based on daily, seasonal, cyclic and/or regional water and energy related demands.

SUMMARY OF THE INVENTION

A tidal based renewable energy system is shown which uses tidal flow and an associated water wheel assembly to provide pumping power between at least a higher elevation storage lake and a lower level storage lake. A water wheel is located at a selected sea level ocean tidal location below both the upper level storage lake and the lower level storage lake, respectively. The water wheel has a series of blades which are acted upon by tidal flow to cause the water wheel to turn as a tide flows in and then out, the water wheel also having an output shaft. A fluid pump is powered by the output shaft of the water wheel, the pump being in fluid communication with the upper storage lake by a run of associated piping, whereby the pump can be used to raise water from the lower level lake to the higher level lake.

Suitably arranged discharge piping connects the upper storage lake to an inlet of a turbine generator for powering the generator as water is discharged from the upper storage lake. The turbine generator also has an outlet which communicates by suitable piping with the lower storage lake for returning water to the lower storage lake. An energy generating cycle can be maintained continuously by again pumping water from the lower level lake to the upper level lake to provide pumped water storage, the pumped water storage providing flow and head to generate electric power through the turbine generator.

In one preferred form, the water wheel is mounted on a floating weir, the weir being located in a water channel with the weir supporting the water wheel at a selected constant depth in the channel as the tide level increases or decreases in height. The water wheel assembly may be located in a lagoon with a suitably arranged barricade being positioned at a mouth location of the water channel to dampen wave action in the lagoon which could impact the water wheel assembly.

Preferably, the water wheel blades are mounted about a circumference of the water wheel at pivot points, the blades each having an arcuate shape which captures water in either of two directions as the blades pivot under the influence of tidal action. The water wheel assembly and its component parts can be constructed largely of light weight, corrosion resistant materials, such as fiberglass.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
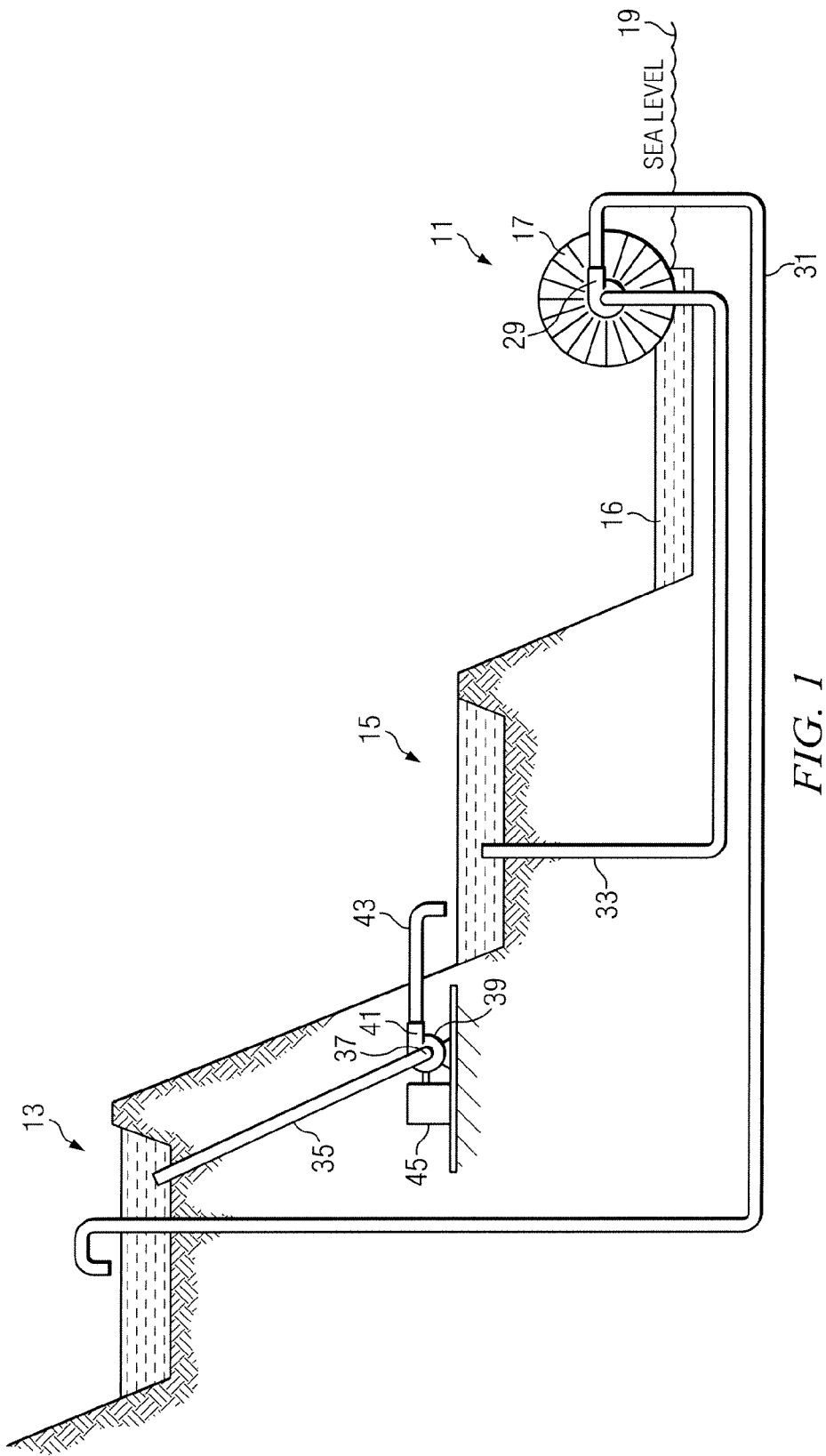
FIG. 1 is a simplified piping schematic of the system of the invention which provides fluid communication between an upper lake, a lower lake and a lagoon, respectively, with a turbine generator located between the upper lake and lower lake.

Turning now to FIG. 1 of the drawings, there is shown a simplified piping schematic of the renewable energy generation system of the invention. As will be described in greater detail in the discussion which follows, the renewably energy system of the invention is a tidal based renewable energy system which uses tidal flow and an associated water wheel assembly (11 in FIG. 1) to provide pumping power between at least a higher elevation storage lake 13 and a lower level storage lake 15.

In the particular example illustrated, the upper lake 13 catchment area is on the order of 6,000 acres while the lower lake catchment area is approximately 4,000 acres. The upper lake 13 is approximately 500 feet above the lower lake in vertical elevational distance. The lagoon area (16 in FIG. 1) is on the order of 191,003,400 square feet. The lagoon 16 is approximately 100 vertical feet below the elevation of the lower lake 15. These are approximate figures given by way of illustration only.

The water wheel assembly was chosen for use in the system of the invention because it is relatively simple in design and yet is proven technology. It can be produced at relatively low cost and can be made using light weight materials which are not affected by the salt water environment. The water wheel assembly 11, shown in FIG. 1, includes a specially constructed water wheel 17 which is located at a selected sea level ocean tidal location 19 below both the upper level storage lake 13 and the lower level storage lake 15, respectively.

Figure 5:
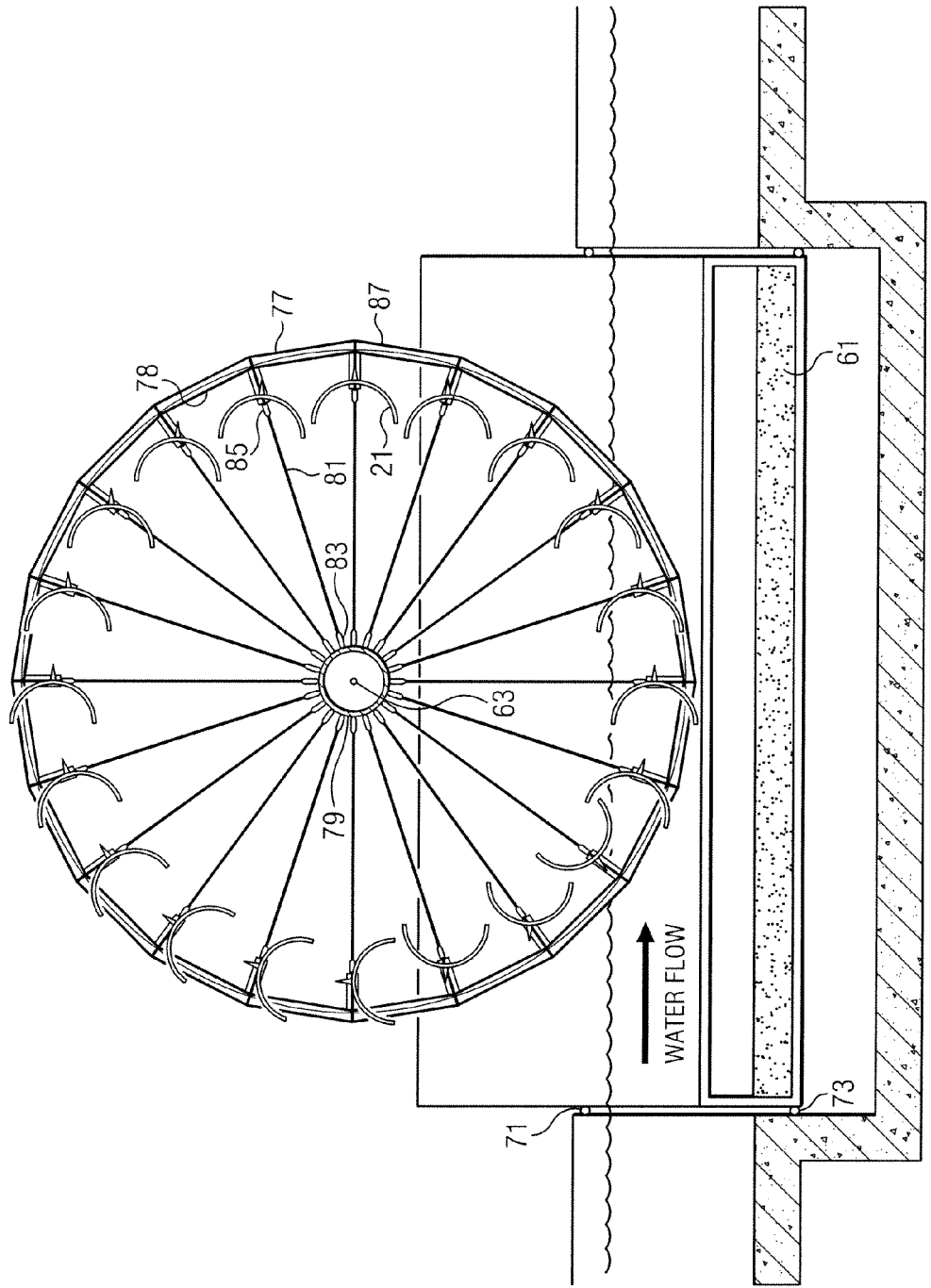
FIG. 5 is a side view of the water wheel and weir assembly of the invention.
Figure 6:
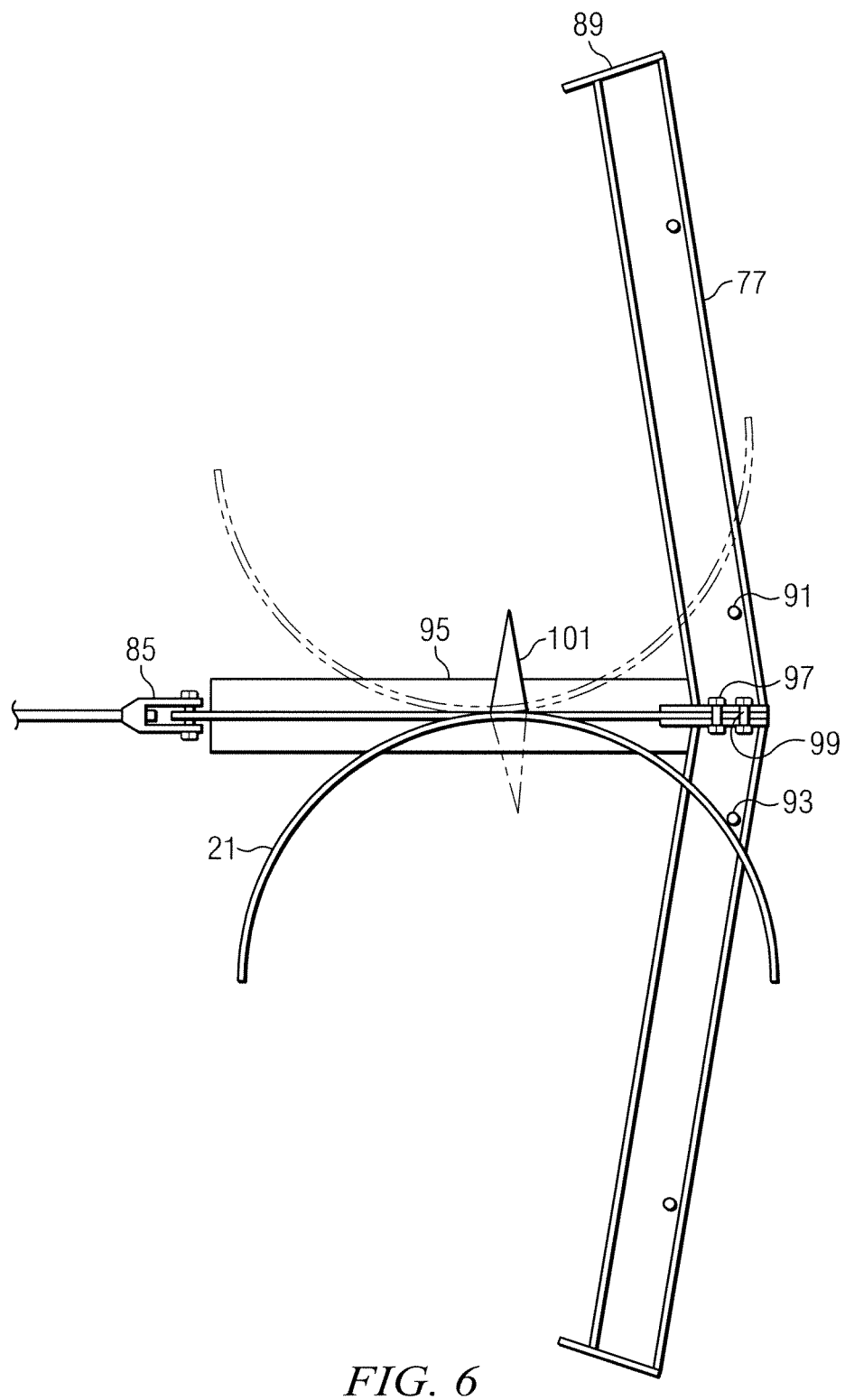
FIG. 6 is a simplified detail illustration of the bi-directional nature of the blades of the water wheel which is used in the practice of the invention.

The details of the construction of the water wheel 11 can be more fully appreciated with reference to FIGS. 5 and 6. The water wheel has a series of blades (21 in FIGS. 5 and 6) which are acted upon by tidal flow to cause the water wheel to turn as a tide flows in and then out. In the tidal based renewable energy system of the invention, the water wheel blades are mounted about a circumference of the water wheel at pivot points, the blades each having an arcuate shape which captures water in either of two directions as the blades pivot under the influence of tidal action. The water wheel also has an output shaft (23 in FIG. 3). In the particular arrangement of components illustrated in FIG. 3, the output shaft 23 is a gear driven shaft and includes a pinion gear 25, universal joints 26, 28, and a reversible gear drive (telescoping) angle drive 27 which are used to communicate thrust to a vertical fluid pump 29 in order to drive the pump.

The pinion gear (25 in FIG. 3) is driven by an associated planetary gear set located about the periphery of the water wheel 17 in order to gear up the output of the water wheel. For example, with a 40 foot diameter wheel 17, it would be desirable to maintain something on the order of 1600-1800 rpm output. However, the water wheel itself can turn no faster than the flow of water dictates, i.e., on the order of 5 rpm. The planetary gear set on the outer circumference of the water wheel mates with the pinion gear on the associated output shaft in order to step the output up to the 1600-1800 rpm range. The pump gear box must also be an alternating gear box which is capable of rotation in either direction.

The fluid pump (illustrated schematically at 29 in FIGS. 1 and 3) is in fluid communication with the upper storage lake 13 by a run of associated piping 31, whereby the pump 29 can be used to raise water from the lower level lake 15 to the higher level lake 13. This is accomplished by means of a 108 inch suction line which feeds the fluid pump 29 and a 108 inch discharge line (shown as 31 in FIG. 1).

In similar fashion, a 108 inch discharge pipe 35 connects the upper storage lake 13 to an inlet 37 of a turbine generator 39 for powering the generator as water is discharged from the upper storage lake 13. The turbine generator 39 also has an outlet 41 which communicates by suitable piping 43 with the lower storage lake 15 for returning water to the lower storage lake. In the example shown, the water turbine 39 powers a 2-20 megawatt electric generator 45. With the various components illustrated in FIG. 1, an energy generating cycle can be maintained continuously by again pumping water from the lower level lake 15 to the upper level lake 13 to provide pumped water storage, the pumped water storage providing flow and head to generate electric power through the turbine 39 and electric generator 45.

Figure 2:
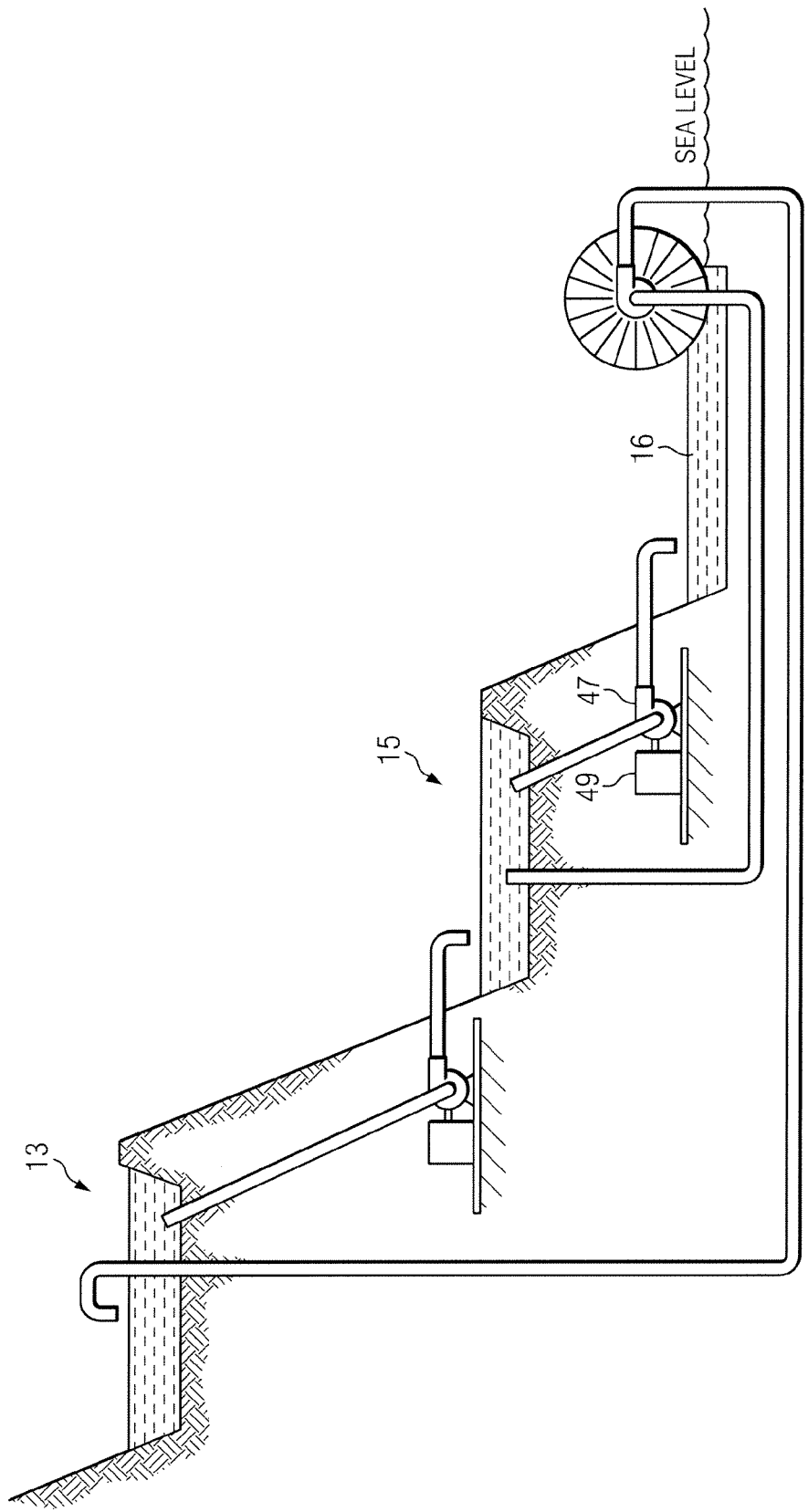
FIG. 2 is a view similar to FIG. 1, but showing a secondary turbine located below the lower lake.

While the system has been illustrated in its simplest form, it will be appreciated that the principal components can be doubled or tripled, etc. depending upon the number of storage lakes used, and other factors. For example, FIG. 2 is a system essentially identical to that of FIG. 1, except that a secondary water turbine 47 and electric generator 49 have been incorporated into the system in order to draw discharge water from the lower lake 15 to drive the turbine 47 before again discharging the output from the turbine to the lagoon 16.

Figure 3:
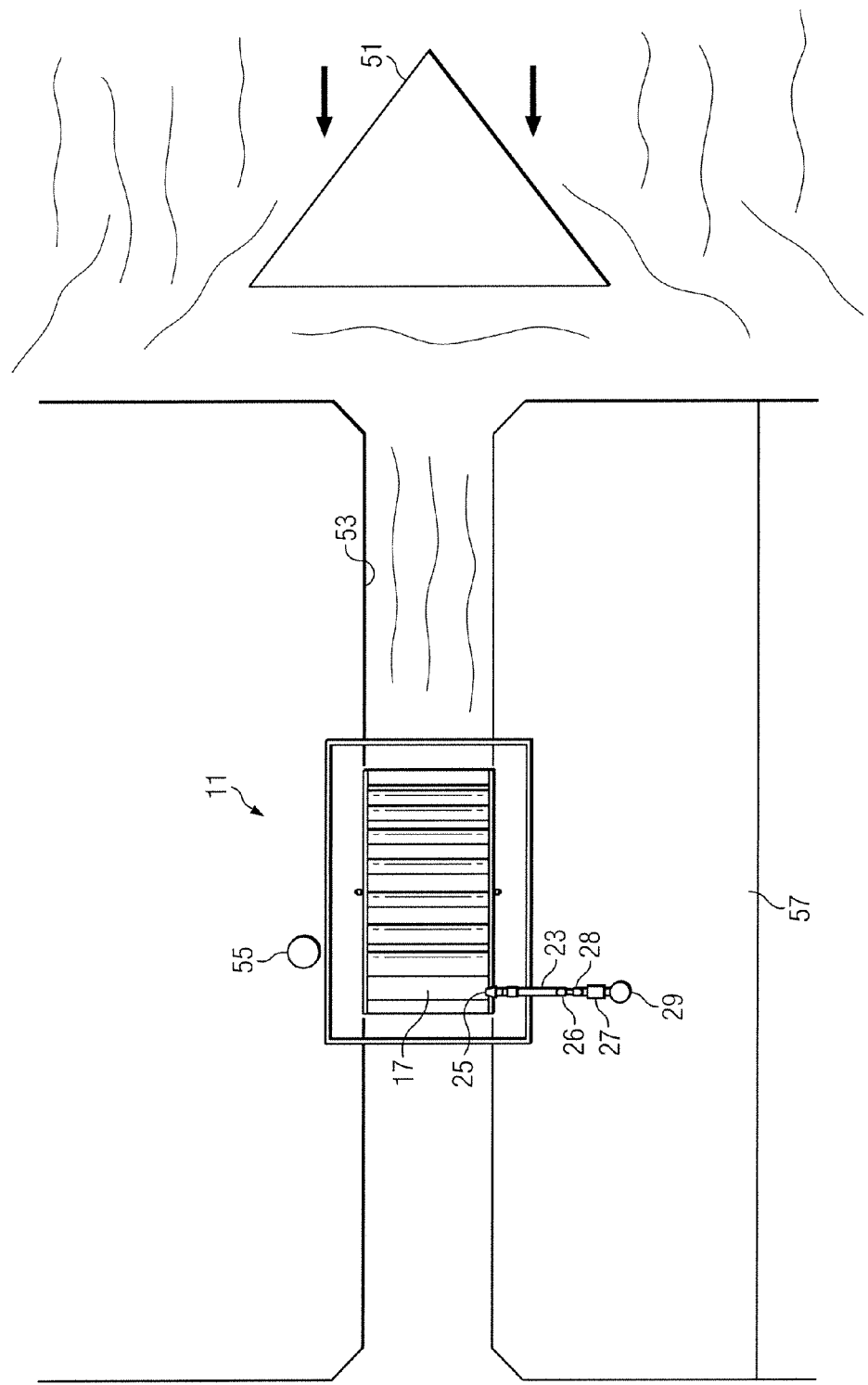
FIG. 3 is a top view of the water wheel and weir assembly used in the renewable energy generation system of the invention.
Figure 4:
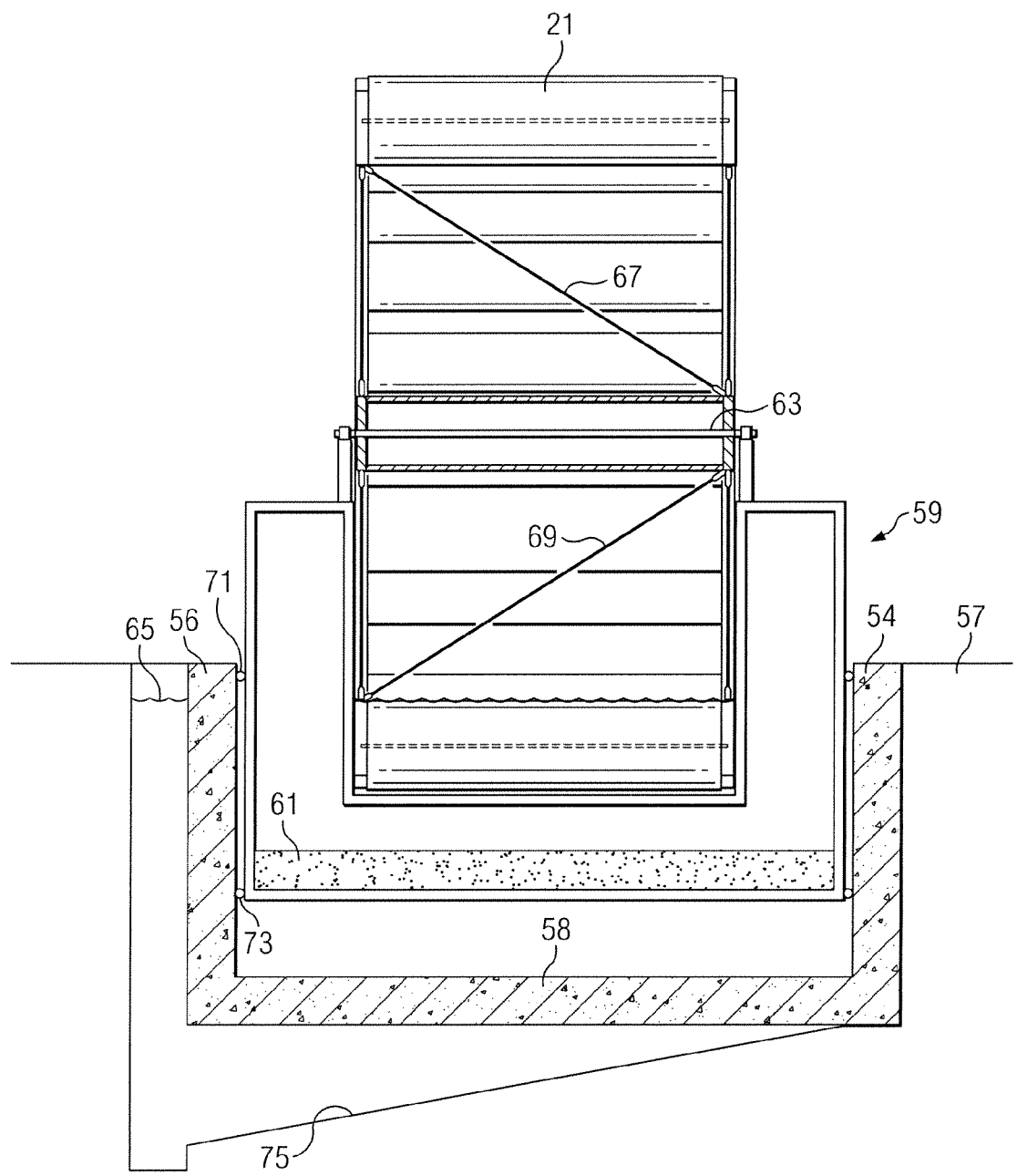
FIG. 4 is an end view of the water wheel and weir assembly of FIG. 3.

FIG. 3 is a top view of the water wheel assembly 11. Note that the assembly is placed behind a barricade island 51 which helps to dampen the wave action coming from the ocean side. The assembly is placed in a channel 53 with the width of the channel being approximately the same as the width of a wheel blade 21. As shown in FIG. 4, the channel can be formed with cast concrete walls 54, 56 and bottom 58. As viewed from the top in FIG. 3, the assembly is placed between dikes 57 built across an estuary on a bay opening to the ocean. The assembly may also be provided with an overflow point 55 to suction out sand and silt (see additional detail in FIG. 4).

It will be appreciated from FIGS. 4 and 5 that the wheel assembly is mounted on a floating weir (59 in FIG. 4). The floating weir 59 can be constructed of fiberglass and provided with bottom sand ballast 61 to insure a given level of floatation of the assembly. The wheel itself turns on an aluminum axle 63 mounted between two sides of the weir. As the tide level increases or decreases in height, the weir floats up or down to maintain a depth of, for example, 5 feet, and blocks the flow of water below 5 feet. This action insures a constant blade depth of the water wheel in the water.

One of the fiberglass blades 21 is shown in FIG. 4. Two fiberglass threaded rods 67, 69 span the wheel diameter between aluminum turnbuckles. Rollers, e.g., 71, 73 maintain the weir to concrete channel spacing. The water level is shown at 65 in FIG. 4. The sloping bottom surface 75 serves to trap sand and silt from under the weir.

FIGS. 5 and 6 show additional detail of the construction and operation of the water wheel assembly. The wheel rim 77 is a fiberglass H-beam with the planetary gear (shown generally at 78 in FIG. 5) being cast of bronze and supplied in 3 pieces which can be assembled on the wheel at the work site. The hub 79 is a 4 foot diameter member of ½ inch wall thickness aluminum. FIG. 5 also illustrates the fiberglass threaded rods 81 extending from the aluminum turnbuckles 83 to oppositely arranged aluminum clevis 85. The sections 87 of the wheel represent 8 inch wide flange beams.

FIG. 6 shows the components used to mount the blades for pivoting movement on the wheel as the tide comes in and then goes back out. Member 89 is a 8"×12"×½" fiberglass gusset plate which caps each end of the 8 inch wide fiberglass flange beam. A fiberglass threaded rod 91, 93 serves as a blade stop for the wheel blade 21. Two ¾ inch diameter aluminum bolts 97, 99 on each side are used to attach the 8 inch wide fiberglass flange beam 95. A fin 101 is used to counterbalance the blade and to rotate the blade with the water flow. The two positions of the blade 21 as the tide is coming in and then going back out are shown in solid and dotted lines in FIG. 6, respectively.

While the water wheel assembly and series of storage lakes could be located in any coastal location having a suitable tidal flow, a particularly advantageous location might be in a remote, third world location needing an electric power source. Factors which might go into the location selection would include ideally finding a large tidal lagoon which has a small opening to the ocean, thereby restricting flow. The lagoon would also need to be located adjacent to a hill or mountain to provide elevation for a high storage lake. The candidate site should also preferably have a large tide to maximum tidal flow.

As an example of the system, a candidate site was selected at La Union, El Salvador on the East Coast of El Salvador. This following discussion is a hypothetical example of the design criteria used in adapting the renewable energy system of the invention to such a candidate location. This site has the following predicted tides per month:

TABLE 1

| | |
|---|---|
| Jul. 1, 2010 | 10' |
| Aug. 1, 2010 | 8' |
| Sep. 1, 2010 | 8' |
| Oct. 1, 2010 | 8' |
| Nov. 1, 2010 | 8' |
| Dec. 1, 2010 | 8.5' |
| Jan. 1, 2011 | 8' |
| Feb. 1, 2011 | 8 |
| Mar. 1, 2011 | 8' |
| Apr. 1, 2011 | 8' |
| May 1, 2011 | 8' |
| Jun. 1, 2011 | 9' |
| Jul. 1, 2011 | 10' |
| Aug. 1, 2011 | 11' |
| Sep. 1, 2011 | 12' |
| Oct. 1, 2011 | 12' |
| Nov. 1, 2011 | 10' |
| Dec. 1, 2011 | 8' |

Assume that for a pilot project that:

Two (2) tides per 24 hours—every day, day or night, rain or shine

Four (4) flows per 24 hours

Two (2) flows into lagoon

Two (2) flows out of lagoon

Six (6) hours per flow to fill on empty lagoon

From these assumptions, one can calculate:
Area of lagoon 191,003,400 s.f.
Height of tide 10 ft
(191,003,400 s.f.)(10 ft)=1,910,034,000 cf
1,910,034,000 cf=106,113 cfs Avg. flow in and out of lagoon every 5 hours
Waterwheel Design, Part 1
(40 ft dia. Wheel)($\pi$)=125.66 ft circumference of wheel
Waterwheel should turn at 5 rpm
(126.66 ft)(5)=628.3 ft/min
628.3 ft/min÷60 sec/min=10.47 ft/sec
Wheel can not turn faster than the flow of water, thus water must flow at approx. 10.47 ft/sec
Wheel must have 3 blades in water at all times
125.66 ft÷6.283 ft between blades=20 blades @ 18 degrees apart
Waterwheel Design, Part 2
Velocity of water out of or into lagoon must be 10.47 ft/sec
Use large ring gear to drive small pinion gear
885 rev/min÷5 rev/min=177:1 ratio
(5 rev/min speed of waterwheel)(125.66 ft circum. of gear) =626.30 ft/min
628.30 ft/min÷885 rev/min=0.7099 ft/rev=circum. of pinion gear
Waterwheel Design, Part 3
C=$\pi$D
0.7099 ft÷$\pi$=D=0.226 ft=Dia. Pinion gear radius=0.113 ft
Need 1,218 ft-lbs on shaft of pinion gear to drive pump and 90° angle gear drive.
1,218 ft-lbs÷0.113 ft=10,778 lbs Force
Waterwheel Design, Part 4
Equation for force on blade of under shot waterwheel=WAv$^2$÷2 g
10,778 lb=(62.5 lbs/ft$^3$)(Area of blade)(10.47 ft/sec)$^2$÷(2) (32.16 ft/sec$^2$)=101.35 ft$^2$ area of blade
Angle drive to pump
1770 rpm÷885=2:1 ratio 1,218÷2=609 ft/lbs
(609 ft-lbs)(1770 rpm)(12 in/ft)÷63,025=205.24 hp
Waterwheel Design, Part 5
Pump Capacity
(205.24 Hp)(0.83)(3960)÷530 ft (head)=1273 gpm÷(60 sec/min)(7.57 gal/ft$^3$)=2.80 cfs
(100 units)(2.80 cfs)=280.27 cfs
Generating Capacity $$KW = (e)(H)(cfs) \div 11.81$$
$$= (.86)(500)(280.27) \div 11.81$$
$$= 10,204.69 \; KW$$

Waterwheel Design, Part 6
Waterwheel power=205.3 Hp at 885 rpm with 1,218 ft-lbs
Output
Angle Drive for pump 1770 rpm of pump at 609 ft-lb
1770 rpm÷885 rpm=2:1 ratio 1218 ft-lbs÷2=609 ft-lbs
Waterwheel Design, Part 7
Pump Capacity
(205.3 Hp)(0.83)(3,960)÷530 ft of head=1,273 gpm÷(60 sec/min)(7.57 gal/ft)=2.80 cfs
(100 units)(2.80 cfs)=280 cfs
The plant capacity is also enhanced by natural rainfall which occurs. For the same site:

TABLE 2

| Rain Fall Chart |
| --- |
| Month 1 = 5 mm |
| Month 2 = 3 mm |
| Month 3 = 8 mm |
| Month 4 = 60 mm |
| Month 5 = 190 mm |
| Month 6 = 322mm |
| Month 7 = 304 mm |
| Month 8 = 297 mm |
| Month 9 = 325 mm |
| Month 10 = 220 mm |
| Month 11 = 35 mm |
| Month 12 = 7 ÷ 1776 mm |

177.6 cm ÷ 2.54 cm/inch = 69.92 inches≈70 inches annual rainfall

Upper Lake Catchment
Lake+Catchment=6,000 Acres
6 ft rain fall per year—80% runoff into lake=4.80 ft
(6,000 Ac)(43,560 ft$^2$/Ac)(4.8 ft runoff/yr)÷(365 days/yr)(24 hrs/day)(60 min/hr)(60 sec/min)
Generating Capacity
280 cfs+62.25 cfs=334.25 cfs
KW=e×H×cfs÷11.81
KW=(0.86)(500 ft)(334.25 cfs) 11.81
KW=12,170
KW=12.17 megawatts
Lower Lake Catchment $$hf = (0.30)(54,900 \; ft)(6.34 \; ft/sec)^{1.75} \div (1000)(7.5 \; ft)^{1.25}$$
$$= 33.61 \; ft(500 \; ft + 33.61 \; ft)(62.4 \; lbs/ft3) \div 144 \; in^2/ft^2$$
$$= 231.25 \; psi \; pressure \; required \; off \; of \; pump$$

Generation from Lower Lake
65.25 cfs+26.52 cfs=91.77 cfs
KW=(0.86)(100 ft)(91.77 cfs)÷11.81
KW=668=.69 meg watts
Total Generation=12.86 meg watts
12.17 meg watts+0.69 meg watts=12.86 meg watts
1-15 meg watt turbine France turbine/generator
1-0.75 meg watt turbine impact wheel turbine/generator
Pipe Size for Pumping Up to Upper Lake
1 pipe flowing 280 cfs
hf=(0.30)(L)(V)$^{1.75}$÷1000 D$^{1.25}$
90 inch diameter pipe
($\pi$)(3.75 ft)$^2$=44.18 ft$^2$
V=Q÷A=280 ft$^3$/sec÷63.62 ft$^2$=6.34 ft/sec
Length of pipe 54,900 ft $$\text{Lower lake + catchment} = 4,000 \; Ac.(4,000 \; Ac.)(43,560 \; ft^2/Ac)$$
$$(4.8 \; ft \; runoff/yr) \div (365 \; days/yr)$$
$$(24 \; hr/day)(60 \; min/hr)(60 \; sec/min)$$
$$= 26.52 \; cfs$$

Budget

| | |
| --- | --- |
| Pumps & angle gear drive | 100 × 40,000 = $4,000,000 |
| Waterwheel | 100 × 40,000 = $4,000,000 |
| Dike & channel | 100 × 40,000 = $4,000,000 |

| | |
|---|---|
| Pipe to upper lake | (34,900 ft)(100.00/ft) = $5,490,000 |
| Pipe upper lake to lower lake | (32,000 ft)(90/ft) = $2,880,000 |
| 1-15 mw turbine/generator | (Allston) = $10,000,000 |
| Construction Upper Lake = | $5,000,000 |
| Construction Lower Lake = | $3,000,000 |
| 1-.75 mw turbine/generator | (Canyon) = $750,000 |
| Engineering Cost = | $750,000 |
| | Total = $39,870,000 |

Pay Back
39,870,000÷12,860 KW=3,100 dollars/KWhr
At 0.10 dollars/Kwhr=31,000 KW hrs
Pay back estimated 3.54 years An invention has been provided with several advantages. The renewable energy system of the invention can be used to supply a predictable and reliable source of electricity to the electric power systems of many remote sites around the world that presently lack adequate electric power sources. The system is relatively simple in design and dependable in operation. The system is also relatively non-polluting as compared to other alternative energy sources. The tidal energy source is more reliable that wave powered systems since it does not depend as heavily upon current weather conditions. Because the system is located in a lagoon or other relatively sheltered location, the component parts can be made of lighter weight and non-corrosive materials than many of the prior art systems.

While the invention has been shown in one of its forms, it is not thus limited and is susceptible to various changes and modifications without departing from the spirit thereof.

I claim:

1. A tidal based renewable energy system which uses tidal flow and an associated water wheel assembly to provide pumping power between at least an upper level storage lake and a lower level storage lake, the system comprising:

a water wheel located at a selected sea level ocean tidal location below both the upper level storage lake and the lower level storage lake, respectively, the water wheel having a series of blades which are acted upon by tidal flow to cause the water wheel to turn as a tide flows in and then out, the water wheel also having an output shaft;

a fluid pump powered by the output shaft of the water wheel, the pump being in fluid communication with the upper level storage lake by a run of associated piping, the fluid pump also being in communication with the lower level storage lake by an associated run of piping, whereby the pump can be used to raise water from the lower level storage lake to the upper level storage lake;

discharge piping connecting the upper level storage lake to an inlet of a turbine generator for powering the generator as water is discharged from the upper level storage lake, the turbine generator also having an outlet which communicates by suitable piping with the lower level storage lake for returning water to the lower level storage lake;

wherein an energy generating cycle can be maintained continuously by again pumping water from the lower level storage lake to the upper level storage lake to provide pumped water storage, the pumped water storage providing flow and head to generate electric power through the turbine generator; and wherein suitable piping is also provided which communicates the lower level storage lake with the sea level location for returning water from the lower level storage lake to the sea level location.

2. The tidal based renewable energy system of claim 1, wherein the pumped water storage in the upper and lower level storage lakes is supplemented by naturally occurring rainfall.

3. The tidal based renewable energy system of claim 1, wherein the water wheel is mounted on a floating weir, the weir being located in a water channel with the weir supporting the water wheel at a selected constant depth in the channel as the tide level increases or decreases in height.

4. A tidal based renewable energy system which uses tidal flow and an associated water wheel assembly to provide pumping power between at least an upper level storage lake and a lower level storage lake, the system comprising:

a water wheel located at a selected sea level ocean tidal location below both the upper level storage lake and the lower level storage lake, respectively, the water wheel having a series of blades which are acted upon by tidal flow to cause the water wheel to turn as a tide flows in and then out, the water wheel also having an output shaft;

a fluid pump powered by the output shaft of the water wheel, the pump being in fluid communication with the upper level storage lake by a run of associated piping, the fluid pump also being in communication with the lower level storage lake by an associated run of piping, whereby the pump can be used to raise water from the lower level storage lake to the upper level storage lake;

discharge piping connecting the upper level storage lake to an inlet of a turbine generator for powering the generator as water is discharged from the upper level storage lake, the turbine generator also having an outlet which communicates by suitable piping with the lower level storage lake for returning water to the lower level storage lake;

wherein an energy generating cycle can be maintained continuously by again pumping water from the lower level storage lake to the upper level storage lake to provide pumped water storage, the pumped water storage providing flow and head to generate electric power through the turbine generator;

wherein the water wheel is mounted on a floating weir, the weir being located in a water channel with the weir supporting the water wheel at a selected constant depth in the channel as the tide level increases or decreases in height; and wherein an additional turbine generator is located below the lower lake and communicates water from the lower lake to the sea level location by means of suitably arranged piping.

5. The tidal based renewable energy system of claim 4, wherein the water wheel assembly is located in a lagoon, and wherein a barricade is positioned at a mouth location of the water channel to dampen wave action in the lagoon which could impact the water wheel assembly.

6. The tidal based renewable energy system of claim 5, wherein the water wheel blades are mounted about a circumference of the water wheel at pivot points, the blades each having an arcuate shape which captures water in either of two directions as the blades pivot under the influence of tidal action.

7. The tidal based renewable energy system of claim 6, wherein the water wheel has a planetary gear mounted about the circumference thereof and an associated output shaft, and wherein the output shaft includes a pinion gear which is driven by the planetary gear of the water wheel.

8. A tidal based renewable energy system which uses tidal flow and an associated water wheel assembly to provide pumping power between at least an upper level storage lake and a lower level storage lake, the system comprising:
- a water wheel located at a selected sea level ocean tidal location below both the upper level storage lake and the lower level storage lake, respectively, the water wheel having a series of blades which are acted upon by tidal flow to cause the water wheel to turn as a tide flows in and then out, the water wheel also having an output shaft;
- a fluid pump powered by the output shaft of the water wheel, the pump being in fluid communication with the upper level storage lake by a run of associated piping, the fluid pump also being in communication with the lower level storage lake by an associated run of piping, whereby the pump can be used to raise water from the lower level storage lake to the upper level storage lake;
- discharge piping connecting the upper level storage lake to an inlet of a turbine generator for powering the generator as water is discharged from the upper level storage lake, the turbine generator also having an outlet which communicates by suitable piping with the lower level storage lake for returning water to the lower level storage lake;
- wherein an energy generating cycle can be maintained continuously by again pumping water from the lower level storage lake to the upper level storage lake to provide pumped water storage, the pumped water storage providing flow and head to generate electric power through the turbine generator;
- wherein the water wheel has a planetary gear mounted about the circumference thereof and an associated output shaft, and wherein the output shaft includes a pinion gear which is driven by the planetary gear of the water wheel,
- wherein the water wheel blades are mounted about a circumference of the water wheel at pivot points, the blades each having an arcuate shape which captures water in either of two directions as the blades pivot under the influence of tidal action,
- wherein the output shaft communicates thrust to a fluid pump by means of universal joints and a reversible gear drive.

9. The tidal based renewable energy system of claim 8, wherein the reversible gear drive is used to power the fluid pump.

10. The tidal based renewable energy system of claim 9, wherein the planetary gear on the outer circumference of the water wheel and mating pinion gear on the associated output shaft provide a stepped up output from the wheel which is in the 1600-1800 rpm range.

* * * * *